United States Patent [19]
Krüger et al.

[11] Patent Number: 5,388,976
[45] Date of Patent: Feb. 14, 1995

[54] WALL THICKNESS MEASURING DEVICE WITH CALIBRATION DEVICE

[75] Inventors: Ernst Krüger, Georgsmarienhütte; Wilhelm Herbach, Bad Oeynhausen, both of Germany

[73] Assignee: Friedrich Theyson GmbH, Bad Oeynhausen, Germany

[21] Appl. No.: 23,803

[22] Filed: Feb. 25, 1993

[30] Foreign Application Priority Data

Feb. 27, 1992 [DE] Germany ............... 4205955
Jul. 3, 1992 [DE] Germany ............... 4221920

[51] Int. Cl.⁶ ............... B29C 47/90; B29C 47/92
[52] U.S. Cl. ............... 425/141; 425/68; 425/70; 425/190; 425/192 R; 425/404; 264/40.1
[58] Field of Search ............. 425/68, 70, 71, 141, 425/190, 192 R, 404; 264/40.1

[56] References Cited

U.S. PATENT DOCUMENTS

| | | | |
|---|---|---|---|
| 3,804,567 | 4/1974 | Recknagel | 425/71 |
| 4,022,557 | 5/1977 | Johnson | 425/71 |
| 4,029,452 | 6/1977 | Schippers et al. | 425/71 |
| 4,152,380 | 5/1979 | Graves et al. | 425/141 |
| 4,543,051 | 9/1985 | Maillefer | 425/71 |
| 4,575,326 | 3/1986 | French | 425/71 |
| 4,705,583 | 11/1987 | Zuber | 425/71 |
| 4,740,146 | 4/1988 | Angelbeck | 425/141 |
| 4,886,438 | 12/1989 | Borger et al. | 425/141 |
| 5,169,649 | 12/1992 | Sikora et al. | 425/141 |

FOREIGN PATENT DOCUMENTS

| | | |
|---|---|---|
| 2239743 | 2/1974 | Germany . |
| 2239747 | 2/1974 | Germany . |
| 3906363 | 11/1990 | Germany . |
| 3936496 | 5/1991 | Germany . |
| 4033433 | 5/1991 | Germany . |

*Primary Examiner*—Khanh Nguyen
*Attorney, Agent, or Firm*—Meltzer, Lippe, Goldstein et al.

[57] ABSTRACT

The invention relates to an extrusion installation for elongate products, more particularly plastics tubes, having an extruder 1, followed by a water-cooled calibration sleeve 8 which can be acted upon by negative pressure and a wall thickness measuring device having an ultrasonic sensor 13. The characterizing feature of the invention is that the calibration sleeve 8 is preceded by a retaining device 10 by which the at least single ultrasonic sensor 13 is borne fixed or rotatable concentrically in relation to the elongate product with a predeterminable distance between its measuring head and the external surface of the elongate product 23, and the retaining device 10 has a releasable attachment sleeve 12 whose diameter so corresponds to the inlet side internal diameter of the calibration sleeve 8 that the attachment sleeve 12 performs a precalibration.

14 Claims, 2 Drawing Sheets

WALL THICKNESS MEASURING DEVICE WITH CALIBRATION DEVICE

BACKGROUND OF THE INVENTION

The invention relates to an extrusion installation for elongate products, more particularly plastics tubes, having an extruder, followed by a water-cooled calibration sleeve which can be acted upon by negative pressure and a wall thickness measuring device having an ultrasonic sensor.

Normally for the measurement of the wall thickness of the elongate product produced by the extrusion installation, more particularly the wall thickness of the plastics tube, use is made of ultrasonic wall thickness measuring apparatuses which are based on the measurement of the running time of the ultrasonic signal introduced into the product. The propagation time of the ultrasonic signal depends on the properties of the material and the temperature of the extruded product. To obtain as accurate an indication as possible of the wall thickness along the periphery of the elongate product, the temperature of the extruded product must be constant at the measuring positions of the ultrasonic sensors, which are normally disposed uniformly distributed over the whole periphery.

DE 39 06 363 C1 discloses an extrusion installation of the kind specified in which the wall thickness measuring device is disposed between the extruder and a cooling system. Rotating sensors are provided which rotate around a fixed, water-cooled calibration sleeve acted upon by negative pressure. It is true that with such a device the temperature distribution over the periphery can be uniformized, but even in that case intolerable inhomogeneities of temperature can still occur. Moreover, the prior art device is comparatively complicated both in construction and handling, since extensive refitting work is needed for transition from one extrusion diameter to another.

In contrast, it is an object of the invention so to further develop an extrusion installation of the kind specified that on the one hand the accuracy of the wall thickness measuring apparatus is improved, while on the other hand the expense of machinery for the refitting of the installation is reduced.

SUMMARY OF THE INVENTION

This problem is solved according to the invention in an extrusion installation for elongate products of the kind specified by the features that the calibration sleeve is preceded by a retaining device by which the at least single ultrasonic sensor is borne fixed with a predeterminable distance between its measuring head and the external surface of the elongate product, and the retaining device has a releasable attachment sleeve whose diameter so corresponds to the inlet side internal diameter of the calibration sleeve.

A distinguishing feature of the invention is that there is only a short spatial distance, due to the local proximity, between the emergence of the extruded product from the extruder nozzle and the position of the ultrasonic sensor. As a result, the extruded elongate product nevertheless has over its whole periphery the same temperature value as when it emerged from the extruder nozzle, since only slight cooling by the surrounding air has taken place as far as the position of the ultrasonic sensors. In addition to the advantage of temperature uniformization, the early wall thickness measurement performed according to the invention has the further advantage that the product quality can be appreciably improved by the extremely short dead time of the wall thickness control process. According to the invention the calibration of the elongate product can be performed in combination with the wall thickness measurement, since the releasable attachment sleeve of the retaining device acts as the calibration sleeve prolonged in the direction of the extruder. Other advantages accrue from the fact that the fixed arrangement of the at least single ultrasonic sensor creates a reliable and mechanically simplified wall thickness measuring device. The releasability of the attachment sleeve means that it can be interchanged in common with the calibration sleeve if production is to be changed over to a different diameter of the elongate product, without the necessity of interchanging the sensor system of the wall thickness measuring device. The predetermined distance between the measuring head and the external surface can be varied as required between the value 0, where the measuring head is disposed directly on the external surface, and another required given value, this being another factor by which ready adaptation to different product diameters can be achieved.

According to another feature of the invention the retaining device and attachment sleeve form a closed chamber inside which an internal space is provided in which the at least single ultrasonic sensor can be flushed around with a coolant, more particularly water; this feature further enhances the measuring precision of the wall thickness measuring device. The resulting intensive cooling in the zone of the space between the measuring head of the ultrasonic sensor and the external surface of the elongate product ensures that the hot substance of the elongate product does not become stuck, more particularly in the inlet zone. The closed chamber formed by the retaining device and the attachment sleeve encapsulates the ultrasonic sensor, thus ensuring satisfactory operation even in rough conditions.

According to another feature of the invention, the generated surface of the attachment sleeve is formed with openings via which the internal space communicates with the outer periphery of the elongate product; this boosts the calibration function of the installation, since the outer generated surface of the elongate product is drawn against the sleeve. Not only can a negative pressure inside the closed chamber be passed on through the openings in the generated surface, but coolants can also pass through, further improving cooling efficiency.

Also according to the invention the internal space so communicates via radial bores with a further inner space that coolant can be conveyed via the bores from a source to the inner space enclosing the measuring head of the ultrasonic sensor; the cooling of the elongate product can consequently be further improved, since turbulence takes place due to the narrowing of the cross-section and the following emergence of the coolant into the inner space enclosing the measuring head.

For this purpose additional so-called turbulence chambers can be provided. The eddying of the coolant also has the advantage that the measuring head is freed from contaminations or air bubbles, which would lead to a falsification of the measuring result.

Also advantageously the inlet zone of the attaching sleeve has an additional cooling, since as a result the cooling rate can be further increased when the elongate product impinges on the attachment chamber. This is advantageous with certain materials, for example, in the extrusion of polyolefins.

Also according to the invention at least two ultrasonic sensors are provided which are disposed offset on the outer periphery of the elongate product and from whose output signal difference a control signal can be derived for the adjustment of the wall thickness of the elongate product; as a result the accuracy of the wall thickness measuring device can advantageously be used in a control circuit. In dependence on the signal difference measured by the sensors, the or each collar of the extrusion nozzle is adjusted as a manipulable variable, so that action can be taken on an inhomogeneous peripheral distribution. The control circuit formed thereby can react practically free from dead time to a different signal of the sensors.

The invention can be put into effect cheaply if the openings of the attachment chamber are acted upon by negative pressure via the vacuum supply from the calibration device. As a result, it is possible to utilize the already installed means for the vacuum supply of the calibration device.

The problem is also solved according to the invention in an extrusion installation for elongate products of the kind specified by the features that the calibration sleeve is preceded by a retaining device by which the at least single ultrasonic sensor is borne with a predeterminable distance between its measuring head and the external surface of the elongate product the at least single ultrasonic sensor being mounted on the retaining device to rotate concentrically of the elongate product, and the retaining device has a releasable attachment sleeve whose diameter so corresponds to the inlet side internal diameter of the calibration sleeve that the attachment sleeve performs a precalibration.

In contrast with the aforedescribed variant, this embodiment has the distinguishing feature that the at least single ultrasonic sensor is disposed not fixed, but rotatable in relation to the periphery of the elongate product. This offers the additional possibility of a rotary or reversing movement of the or each sensor in relation to the surface of the elongate product. If use is made of a number of ultrasonic sensors disposed offset on the periphery, they must be rotated only by an angle corresponding to the particular angular division to cover the whole periphery.

BRIEF DESCRIPTION OF THE DRAWINGS

An embodiment of the invention will now be explained in greater detail with reference to the drawings, wherein.

DETAILED DESCRIPTION OF THE INVENTION

Figure 1:
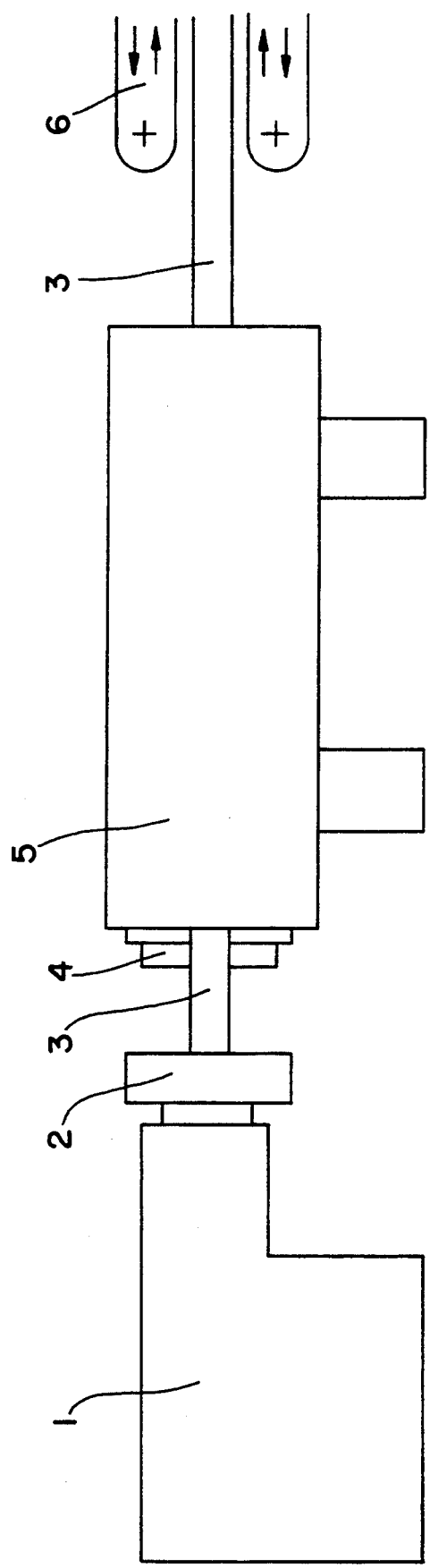
FIG. 1 is an axial section through an extrusion installation.
Figure 2:
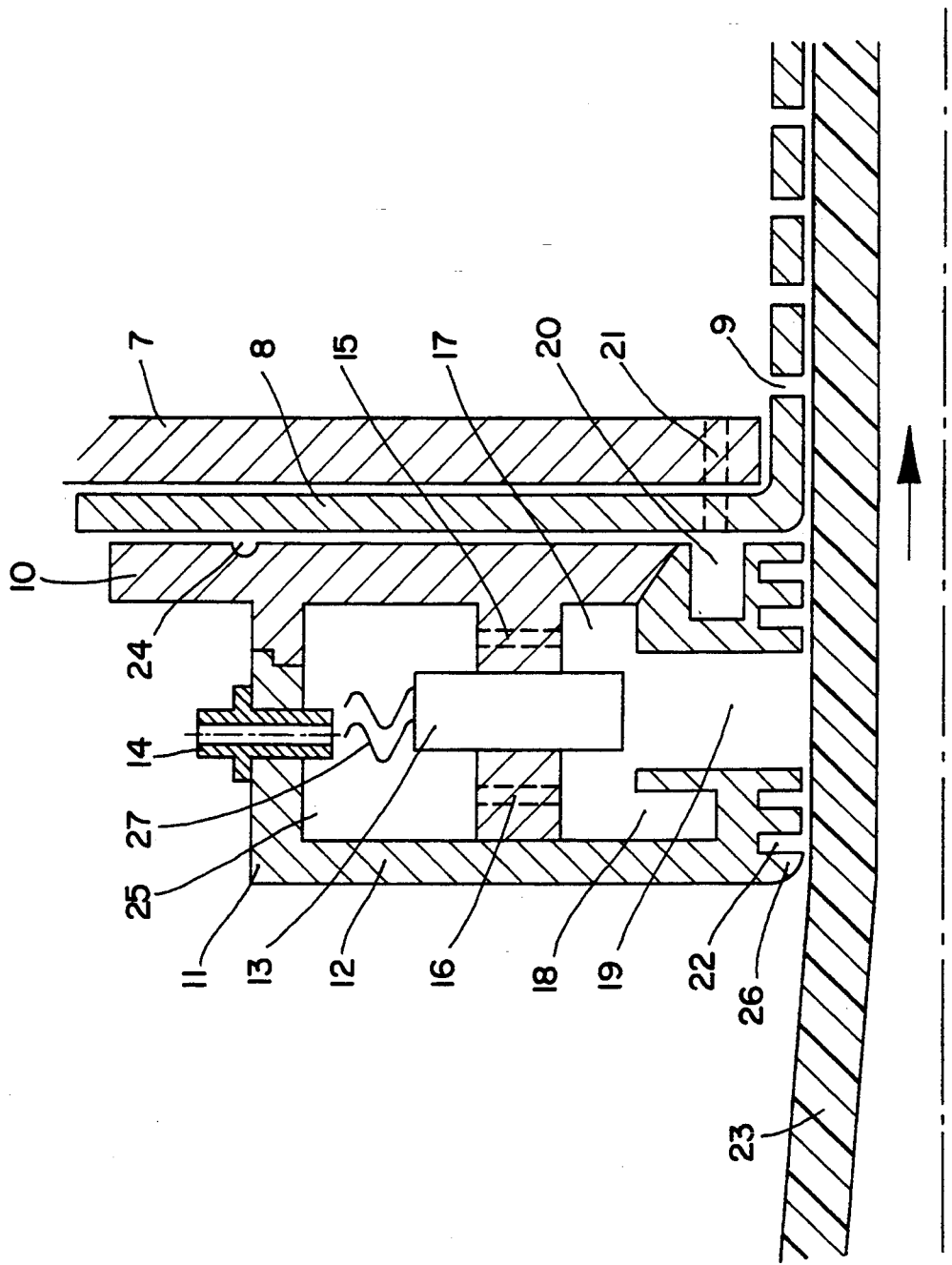
FIG. 2 shows a detail of the device illustrated in FIG. 1 in the zone of the wall thickness measuring device.

As can be seen from FIG. 1, after the emergence of the hot plastics substance from nozzles 2 of extruder 1, an extruded elongate product, which can more particularly be a plastics tube 3, first passes through the zone of an attachment chamber 4 preceding a calibration device 5 which has a water-cooled calibration sleeve acted upon by negative pressure. After emerging from the calibration device 5, the tube 3 passes through the zone of a caterpillar pull-off 6. As FIG. 2 shows, the calibration device 5 mainly comprises a calibration sleeve 8 whose surface associated with the extruded pipe 23 is formed with openings 9 through which negative pressure can act on the generated surface of the tube. The calibration sleeve 8 is releasably attached to a front wall 7 of the calibration device. The calibration device 5 is preceded by an attachment chamber 4 consisting of elements 10, 11 and 12 (FIG. 2).

The arrow at the bottom of FIG. 2 indicates the direction in which the extruded elongate product runs.

The attachment chamber comprises a rear wall 10 sealed via a circularly extending groove 24 against the calibration sleeve 8, to which the rear wall 10 is attached. The rear wall 10 acts as a retaining device for an ultrasonic sensor 13. To this end the rear wall 10 has ribbed zones within which the cylindrical ultrasonic sensor 13 can be so displaced axially that the distance between the measuring head and the external surface of the tube wall 23 can be adjusted inside an inner space 19.

The inlet side boundary of the attachment chamber is formed by a cover 11 which is releasably attached together with an attachment sleeve 12 to the rear wall 10. The surface of the attachment sleeve 12 adjacent the elongate product is formed with slots 22 via which the extruded elongate product is connected by pressure technology to the inner space formed in the interior of the attachment chamber.

The inner space of the attachment chamber is connected via a vacuum distributing ring 20 and a vacuum bore 21 to the inside volume of the calibration device 5, so that the volumes can be evacuated in common.

The inlet zone 26 of the attachment chamber has an additional cooling.

Disposed inside the ribs bearing the ultrasonic sensor 13 are radially extending ducts 15, 16 through which the coolant, more particularly water, can pass from an upper chamber 25 into the internal space 19. The communication between the radial bores 15, 16 and the inner space is effected via turbulence chambers 18, 19 in which the coolant passed by pressure through the radial bores 15, 16 is eddied.

Disposed on the top side of the attachment chamber is a connection for providing the coolant, said connection also being used as the lead-in for the electric connections of the ultrasonic sensor 13, shown in general by the reference 27.

The extrusion installation according to the invention operates as follows:

By means of the extrusion installation according to the invention plastics tubes 3 are produced which immediately after emergence from the nozzle 2 of the extruder 1 still have substantially the temperature of the substance at the extruder. The wall thickness of the emerging tube 6 is dimensioned in the zone immediately following the nozzle via ultrasonic sensors 13 disposed offset over the periphery of the tube 3. The integration of the sensor in the calibration attachment chamber ensures that the substance of the elongate product to be measured has over its entire width and its entire periphery the same temperature, since up to this place of the elongate product, surrounding air has acted with cooling effect on the tube only slightly over a very short distance between the exit from the nozzle and the measuring position. Since the tube is acted upon by a negative pressure at the attachment chamber, the tube is precalibrated even before it enters the actual calibration device 5. The intensive cooling by the heat exchange effected through the openings 22 with the cooled attachment chamber ensures that the hot tube does not become stuck more particularly in the inlet zone 26 of the attachment chamber.

The extrusion installation described can be very simply re-equipped for different tube diameters to be extruded; for this purpose all that must be done is to interchange the calibration sleeve 8 and the attachment sleeve 12, while the ultrasonic sensor 13 remains fixed on the supporting rear wall 10 of the attachment chamber. If required, the ultrasonic sensor 13 can be moved in the axial direction towards or away from the generated surface of the tube, to obtain the optimum distance between the measuring head and said generated surface. The inner space 19 can be substantially or completely filled with coolant, more particularly water, to achieve optimum coupling to the product to be measured. The eddying of the coolant in the turbulence chambers 18, 19 which the coolant enters after passing through the radial bores 15, 16 flushes the measuring head of the sensor 13 free and at the same time produces the contact via the inner opening 19 with the external diameter of the tube 23. At the same time coolant is removed by suction via the openings 22.

This ensures that the tube 23 is intensively cooled and precalibrated by the application of the negative pressure to the circularly extended openings 22 and that the temperature of the tube 23 is uniform over the whole periphery in the zone of the ultrasonic sensors 13.

On the one hand, assembly is a simple matter due to the very short construction of the attachment chamber 4. On the other hand, the complete encapsulation of the ultrasonic sensor 13 enables a measurement to be made even under the roughest operating conditions.

We claim:

1. An extrusion installation for producing an elongated product, comprising,
   an extruder,
   a water-cooled calibration sleeve acted upon by negative pressure following said extruder which performs a final calibration of the wall thickness of said elongated product,
   a retaining device located between said extruder and said calibration sleeve, said retaining device being attached to said calibration sleeve,
   an attachment sleeve which i separate from said calibration sleeve and attached to said retaining device, said attachment sleeve having an inner diameter which is substantially the same as that of said calibration sleeve so as to precalibrate said elongated product emerging from said extruder before it enters said calibration sleeve for final calibration, and
   a wall thickness measuring device having at least a single ultrasonic sensor which is located at a predetermined distance defined between its measuring head and the outer surface of said elongated product, said wall thickness measuring device being attached to said retaining device and being located between said attachment sleeve and said calibration sleeve so as to measure the wall thickness of said elongated product between precalibration and final calibration.

2. An extrusion installation according to claim 1 wherein said elongated product is a plastic tube.

3. An extrusion installation according to claim 1 wherein said ultrasonic sensor is kept fixed by said retaining device.

4. An extrusion installation according to claim 1 wherein said single ultrasonic sensor is rotatably mounted on said retaining device so as to rotate concentrically around said elongated product.

5. An extrusion installation according to claim 1 wherein said attachment sleeve is releasably mounted to said retaining device.

6. An extrusion installation according to claim 1 wherein said retaining device and said attachment sleeve form a closed chamber having a first internal space containing said ultrasonic sensor which can be flushed with a coolant.

7. An extrusion installation according to claim 6 wherein said attachment sleeve includes openings via which said first internal space communicates with the outer periphery of said elongated product.

8. An extrusion installation according to claim 6 wherein said retaining device and said attachment sleeve form a second inner space which communicates with said first internal space via radial bores so that a coolant can be conveyed via said bores to said first inner space containing the ultrasonic sensor.

9. An extrusion installation according to claim 8 wherein said first internal space comprises at least one turbulence chamber wherein coolant emerging from said radial bores is eddied.

10. An extrusion installation according to claim 8 wherein said first inner space comprises two turbulence chambers in which coolant emerging from said radial bores is eddied.

11. An extrusion installation according to claim 1 wherein said attachment sleeve includes an inlet zone which is cooled.

12. An extrusion installation according to claim 11 comprising a plurality of ultrasonic sensors which are distributed offset on the periphery of said retaining device.

13. An extrusion installation according to claim 1 comprising at least two ultrasonic sensors which are disposed offset from each other along the outer periphery of said elongated product.

14. An extrusion installation according to claim 1 wherein said attachment sleeve includes openings acted upon by negative pressure from a vacuum supply which also supplies the negative pressure to said calibration sleeve.

* * * * *